United States Patent [19]

Kirkham

[11] 4,382,485

[45] May 10, 1983

[54] HYDRAULIC LOGIC CONTROL FOR VARIABLE DISPLACEMENT PUMP

[75] Inventor: Steven C. Kirkham, McHenry, Ill.

[73] Assignee: Dresser Industries, Inc., Dallas, Tex.

[21] Appl. No.: 153,118

[22] Filed: May 27, 1980

[51] Int. Cl.³ ............................................. B60K 17/10
[52] U.S. Cl. ..................................... 180/306; 60/428; 60/450; 417/216
[58] Field of Search .................. 180/306; 60/428, 430, 60/447, 450; 417/216, 212

[56] References Cited

U.S. PATENT DOCUMENTS 3,962,870  6/1976  Lech ...................................... 60/428
3,985,472 10/1976  Virtue et al. ...................... 60/428 X
4,203,712  5/1980  Uehara .............................. 60/417 X

FOREIGN PATENT DOCUMENTS 2823559 12/1979  Fed. Rep. of Germany ........ 60/447

Primary Examiner—John A. Pekar
Attorney, Agent, or Firm—J. N. Hazelwood; B. E. Deutsch

[57] ABSTRACT

A variable speed engine (10) drives a tractive effort drive train (12) and fixed and variable displacement pumps, (14 and 16) arranged to supply fluid pressure to a hydraulic work system (24). The displacement of the variable pump (16) is determined by a control ram (42) and a conduit (44, 53, 74) interconnects the variable pump output and the control ram (42). An engine speed control valve (60) and a system pressure compensator valve (46) interposed in series in said conduit (44, 53, 74). The two valves (60 and 46) maintain the variable pump (16) at full output except when low engine speed and high system pressure exists simultaneously.

4 Claims, 2 Drawing Figures

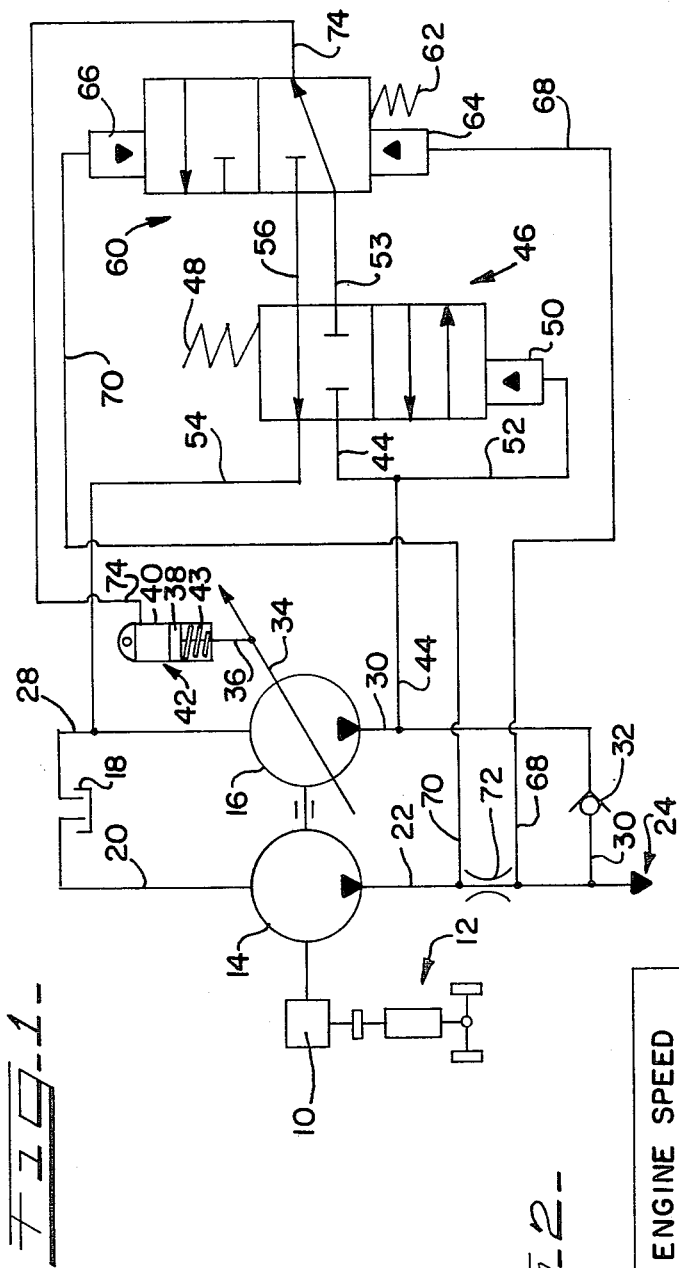

HYDRAULIC LOGIC CONTROL FOR VARIABLE DISPLACEMENT PUMP

CROSS-REFERENCE TO RELATED APPLICATIONS

The invention disclosed and claimed herein is related to U.S. patent applications, Ser. No. 153,119 entitled "Hydraulic System For Responsive Splitting of Engine Power" by S. C. Kirkham and Ser. No. 153,120 entitled "Control Means For Variable Displacement Pump" by S. C. Kirkham and R. K. Schantz. The referenced applications have a filing date and assignee in common with this application.

BACKGROUND AND SUMMARY OF THE INVENTION

In most types of agricultural, industrial and construction equipment, the speed of travel is directly a function of engine speed for any given drive train ratio. The operator of such a piece of equipment, such as a wheeled loader for example, determines the speed of travel by controlling engine speed. This is a convenient and effective means of speed control. The engine on such equipment also drives hydraulic pump or pumps to supply fluid pressure for manipulation of hydraulically-actuated equipment mounted on or towed behind the vehicle. The output of these pumps is related to their speed of rotation which is proportional to the speed of the engine driving them. Thus, pump flow will decrease as engine speed decreases. Engine speed is reduced by choice when the operator wants to slow the vehicle's speed and/or by load imposed on the engine when the operator is performing work with the equipment. It is most evident in the latter situation when the engine is lugged down by the combined load of tractive effort and hydraulic work, which is the product of flow and pressure. For example, in the case of a wheeled loader, the operator may fill the bucket by driving the vehicle forward with the bucket lowered in a digging attitude. As the tractive effort forces the bucket into the material; the boom arms supporting the bucket are raised and the bucket is rolled back. The combined load will, without the exercise of operator judgment and skill, kill the engine.

Some prior art arrangements on equipment with engine speeds which are operator-variable have provided a pump system in which a variable displacement pump is destroked as engine speed is reduced. However, this automatically reduces pump flow in not only those situations where engine speed is reduced by the load imposed, but also in those situations where engine speed has been reduced by operator choice simply to slow the vehicle's travel rate. As a consequence, pump flow, which is already reduced by lowered engine speed, is even further reduced by destroking one or more of the variable displacement pumps. The response of steering and/or hydraulically-actuated equipment is thereby slower.

Still other arrangements in the prior art have used a pressure compensator to destroke a variable pump when high system pressures occur. Again, there are situations where hydraulic response is slowed because of reduction in fluid flow when such reduction is not necessary to prevent killing the engine.

It is, therefore, an object of this invention to provide a hydraulic control circuit for a variable displacement pump which utilizes hydraulic logic to determine when conditions necessitate destroking of the pump.

It is also an object of the invention to provide a vehicle with an engine powering both a tractive effort drive train and a hydraulic work system with a means for utilizing the engine efficiently and to its fullest potential, and to accomplish this with only minimal input of operator judgment or skill.

It is another object of this invention to provide a hydraulic system which will permit responsive and rapid movement of hydraulic equipment under those conditions in which the engine is capable of supplying the necessary power and which will maximize that portion of the engine's power to the tractive effort drive train under those conditions in which the engine is incapable of meeting the power requirements of both the drive train and the hydraulic system.

These and other objects of the present invention, and many of the attendant advantages thereof, will become more readily apparent upon a perusal of the following description and the accompanying drawing, wherein:

FIG. 1 is a schematic drawing of a hydraulic circuit according to the present, and FIG. 2 is a logic table showing the output of the variable displacement pump in the circuit of FIG. 1 under different combinations of circuit pressure and engine speed.

DESCRIPTION OF A PREFERRED EMBODIMENT

Referring now to FIG. 1, there is shown an engine 10 which powers a conventional tractive effort drive train, indicated generally at 12, a fixed displacement pump 14 and a variable displacement pump 16. The fixed displacement pump 14 draws fluid from reservoir 18 through conduit 20 and discharges fluid under pressure through supply conduit 22 to a hydraulic work circuit, indicated generally by the arrowhead 24. The work circuit is conventional and may be of the type shown and described as element 26 in the first listed cross-referenced application. A conduit 28 connects the suction side of the variable pump 16 with the reservoir 18 and conduit 30 connects the high pressure discharge side of pump 16 with conduit 22 so that both pumps 14 and 16 may supply hydraulic fluid under pressure to the work circuit 24. A check valve 32 is interposed in the conduit 30 and permits flow only from the pump 30 toward the conduit 22, thereby preventing fluid flow from the pump 14 to the pump 16 when the latter pump is destroked.

The displacement of the variable pump 16 is determined by a control member 34 to which the rod 36 is pivotally attached. The rod 36 is secured to a piston 38 reciprocable within a cylinder 40 of a control ram 42. A compression spring 44 trapped within the cylinder 40 between the rod end thereof and the piston 38 urges the piston 38 upward to contract the control ram 42. When the ram 38 is fully contracted the movable member 34 has conditioned the pump 16 for maximum displacement.

A pilot conduit 44 connects with the discharge conduit 30 and with one port of a pressure compensator valve 46, which is a two position, four-port valve. A compression spring 48 urges the valve 46 to the position shown in FIG. 1, and a hydraulic actuator 50, which is supplied with hydraulic pressure through a branch conduit 52 communicating with pilot conduit 44, is capable of moving the valve 46 upward, as viewed in FIG. 1, to its second position when the pressure in actuator 50 provides a force exceeding the force of spring 48. A return conduit 54 connects the valve 46 with the reservoir 18 through conduit 28. A pair of conduits 56 and 53 connect the ports on the opposite side of valve 46 with an engine speed control valve 60. The conduits 54 and 56 are in communication in both positions of the valve 46, while the pilot conduits 44 and 53 are blocked from communication in the position shown in FIG. 1, but are in communication when shifted upward therefrom.

The engine speed valve 60 is a two position, three port valve which is biased toward the position shown in FIG. 1 by the spring 62. A pair of hydraulic actuators 64 and 66 are provided to urge the valve 60 in opposite directions, the actuator 64 providing a force to supplement the force of spring 62 and the actuator 66 providing a force in opposition thereto. Conduits 68 and 70 connect with the actuators 64 and 66 respectively, with the conduit 68 communicating with the supply conduit 22 downstream of a fixed orifice 72 interposed therein and the conduit 70 communicating with the supply conduit 22 upstream of orifice 72. A pilot conduit 74 connects the opposite side of valve 60 with the head end of control ram 42. Since the pump 14 is of the fixed displacement type, its output is proportional to the speed of the engine 10. In addition, since the connection of conduit 30 with conduit 22 is downstream of the orifice 72, the flow of fluid through, and the pressure drop across, the orifice 72 will provide a signal which is a function of engine speed. At low engine speeds the flow through the orifice 72 will also be low resulting in a small pressure drop thereacross. The conduit 68 will transmit pressure to actuator 64 which will not be appreciably lower than the pressure transmitted to actuator 66 through conduit 70. The combined forces of the spring 62 and the actuator 64 will exceed the force of the slightly higher pressure in actuator 66 causing the valve 70 to be positioned as shown in FIG. 1, wherein the conduit 74 is in complete communication with the conduit 53 and blocked from communication with the conduit 56. At higher engine speeds, the pressure drop across orifice 72 increases, causing the pressure in conduit 70 to increase relative to the pressure in conduit 68. At the point where the force of the pressure in actuator 66 exceeds the combined forces of the pressure in actuator 64 and the fully compressed spring 62, the valve 70 will be shifted to its fully downward position, as viewed in FIG. 1, wherein the conduit 74 is in communication with the conduit 56 and blocked from communicating with conduit 53. Regardless of the position of the valve 46, the head end of control ram 42 will be connected with the reservoir 18 by means of conduits 74, 56, 54 and 28 whenever high engine speeds have caused valve 60 to shift to its extreme position against the bias of the spring 62. Connection of the control ram 42 to the reservoir 18 permits the spring 44 to fully contract the control ram 42 and thereby moving the control member 34 to condition the pump 16 for maximum displacement. Thus, with high engine speed the pump 16 will be at full stroke regardless of whether low pressure in the work circuit has positioned the pressure compensator valve 46 as shown or whether high circuit pressure has shifted the valve 46 to its upward position. As engine speed falls to a lower level, the valve 60 returns to the position shown, in which the conduit 74 is connected with conduit 53 and blocked from conduit 56. When low pressure exists in the work circuit, the pressure compensator valve 46 will remain as shown in FIG. 1 with the pilot conduit 44 being blocked from communication with the conduit 53. Since pressure cannot be transmitted to the control ram 42, the spring 44 will maintain the pump 16 at full stroke. However, at high pressure levels, the pressure compensator valve 46 will be shifted upward by the actuator 50 against the bias of spring 48. In its upward position, the valve 46 connects the conduit 44 with the conduit 53 which will transmit pressure, with the valve 60 as shown, to the control ram 42 causing it to be extended and the control member 34 moved to destroke the pump 16.

The result of the action of the two valves 46 and 60 can be readily seen in the logic table of FIG. 2. This table is arranged with engine speed across the top and the work circuit pressure along the left vertical edge of the table. As seen from the top row of FIG. 2, at low pressures, the pump 16 is maintained at full displacement or output regardless of engine speed. As seen from the right hand column, the pump 16 is maintained at full output regardless of system pressure at high engine speed. The left hand column and bottom row indicate that the pump 16 is destroked, i.e. moved to zero displacement, only when low engine speed and high work circuit pressure exist simultaneously. Thus, hydraulic load, which is measured by the compensator valve 46, alone will not cause the variable pump 16 to destroke. Further, reduction of the engine speed by the foot throttle, as a matter of choice by the operator, will not alone stroke the pump 16. Only when the hydraulic load and the tractive effort load combine to lug the engine down will the variable pump destroke to reduce the hydraulic load on the engine. The valves 46 and 60 may be of the poppet type, i.e. either in one extreme position or the other, but preferrable are capable of metering between their respective extreme positions. Metering permits a gradual transition between the full stroke and destroked conditions for the pump 16 and precludes a sudden and abrupt change in the speed or response of the hydraulic equipment to which the pump 16 is partially supplying hydraulic fluid under pressure.

It will be seen from the above description that the present invention accomplishes the foregoing objects. While a preferred embodiment has been illustrated and described, various changes and modifications may be made therein without departing from the spirit of the invention as defined by the scope of the appended claims.

What is claimed is:

1. In a vehicle having an engine capable of driving a motive drive train and fixed and variable displacement pumps arranged in a hydraulic work circuit, the improvement comprising a control means for destroking said variable displacement pump to zero output only when low engine speed and high circuit pressure exists simultaneously, said control means further comprising:
   a control ram for destroking said variable displacement pump;
   a conduit connecting the control ram with the output of one of said pumps;
   an engine speed responsive valve and a circuit pressure responsive valve connected in series in said conduit;
   said engine speed responsive valve arranged to block said conduit except when said engine speed is at or below a preselected low engine speed; and
   said circuit pressure responsive valve arranged to block said conduit except when a preselected high pressure occurs in said circuit.

2. The invention according to claim 1, wherein:
said engine speed responsive valve has a first position blocking said conduit and a second position opening said conduit and opposed valve actuators at the opposite ends of said valve which moves said valve from one position to the other in response to the relative pressures supplied to said actuators;
an orifice is positioned in the output of said fixed pump; and
sensing conduits are connected on each side of said orifice and respectively with said valve actuators of said speed valve.

3. In a vehicle having an engine, a motive drive train driven by said engine, and a hydraulic work circuit including engine driven fixed and variable displacement hydraulic pumps, a control means for controlling the stroke of said variable displacement pump comprising:
a control ram for destroking said variable displacement pump upon the application of fluid pressure thereto;
a fluid pressure source disposed to supply fluid to said control ram;
an engine speed responsive valve hydraulically disposed between said control ram and said fluid pressure source having a first position permitting flow therethrough in response to a selected low engine speed and a second normal position prohibiting flow therethrough at higher engine speeds than said low engine speed;
a circuit pressure responsive valve hydraulically disposed between said control ram and said fluid pressure source having a first position permitting flow therethrough in response to a selected high pressure existing in said hydraulic work circuit and second normal position prohibiting flow therethrough in response to lower pressures in said work circuit than said selected high pressure; and
means operatively interconnecting said engine speed responsive valve and said circuit pressure responsive valve such that said fluid pressure is supplied to said control ram only when both said engine speed responsive valve and said circuit pressure responsive valve are in their respective first positions.

4. The invention according to claim 3 and said means operatively interconnecting said engine speed responsive valve and said circuit pressure responsive valve comprising a conduit affecting a series connection of said valves between said fluid pressure source and said control ram.

* * * * *